(12) United States Patent
Takase et al.

(10) Patent No.: US 6,569,531 B1
(45) Date of Patent: May 27, 2003

(54) ADDITIVE-CONTAINING MOLDED RESIN AND PROCESS FOR PRODUCING THE SAME

(75) Inventors: Hirofumi Takase, Osaka (JP); Yoichiro Makimura, Osaka (JP)

(73) Assignee: Takiron Co., Ltd., Osaka (JP)

( * ) Notice: Subject to any disclaimer, the term of this patent is extended or adjusted under 35 U.S.C. 154(b) by 0 days.

(21) Appl. No.: 09/673,307

(22) PCT Filed: Feb. 15, 1999

(86) PCT No.: PCT/JP99/00646

§ 371 (c)(1),
(2), (4) Date: Oct. 16, 2000

(87) PCT Pub. No.: WO00/47653

PCT Pub. Date: Aug. 17, 2000

(51) Int. Cl.$^7$ .......................... B32B 27/08; B32B 27/18; B32B 27/36

(52) U.S. Cl. .................. 428/412; 428/480; 428/483; 106/15.05; 106/18.11; 106/18.14; 106/18.31; 524/87; 524/91; 524/92; 524/94; 524/127; 524/262; 524/341; 524/342; 524/343; 524/236; 524/247

(58) Field of Search ................... 428/480, 483, 428/412; 106/15.05, 18.11, 18.31, 18.14; 524/86, 87, 91, 92, 94, 104, 105, 106, 115, 121, 127, 136, 261, 262, 323, 341, 342, 343, 186, 236, 247

(56) References Cited

U.S. PATENT DOCUMENTS

| | | | | |
|---|---|---|---|---|
| 3,862,087 A | * | 1/1975 | Heller et al. | 524/89 |
| 4,101,528 A | * | 7/1978 | Knopka | 524/409 |
| 4,107,122 A | * | 8/1978 | Morgan et al. | 524/101 |
| 4,355,080 A | * | 10/1982 | Zannucci | 428/483 |
| 4,399,265 A | * | 8/1983 | Garware et al. | 528/308.2 |
| 4,868,246 A | * | 9/1989 | MacLeay et al. | 525/142 |
| 4,874,647 A | * | 10/1989 | Yatsu et al. | 428/35.7 |
| 4,981,914 A | * | 1/1991 | MacLeay et al. | 525/327.5 |
| 5,096,977 A | * | 3/1992 | MacLeay et al. | 525/327.6 |
| 5,607,987 A | * | 3/1997 | Winter et al. | 524/91 |
| 5,631,124 A | * | 5/1997 | Ikuhara et al. | 430/533 |
| 5,654,347 A | * | 8/1997 | Khemani et al. | 521/138 |
| 5,783,307 A | * | 7/1998 | Fagerburg et al. | 428/412 |
| 5,977,219 A | * | 11/1999 | Ravichandran et al. | 524/100 |
| 6,136,441 A | * | 10/2000 | MacGregor et al. | 428/412 |

FOREIGN PATENT DOCUMENTS

| | | |
|---|---|---|
| JP | 36-18550 | 10/1961 |
| JP | 38-15095 | 8/1963 |
| JP | 50-3454 | 1/1975 |
| JP | 59-62628 | 4/1984 |
| JP | 62-70419 | 3/1987 |
| JP | 63-75088 | 4/1988 |
| JP | 9-95603 | 4/1997 |
| JP | 10-130405 | 5/1998 |

\* cited by examiner

*Primary Examiner*—Vivian Chen
(74) *Attorney, Agent, or Firm*—Nixon & Vanderhye P.C.

(57) ABSTRACT

An additive-containing resin molded article which suffers from little exudation or vaporization of an additive and sustains the effect of the additive for a long period of time and in which reductions in various physical properties due to molecular weight reduction of a polyester resin are suppressed, and a process for producing the same are provided. When a polyester resin 5 is heat-melted and molded into a prescribed shape by means of an extruder 1, etc., a bi- or multi-functional additive 6 having at least one of a functional hydroxyl group, carboxyl group, amino group, and ester bond is added and allowed to react with the polymer molecules of the molten polyester resin 5 to obtain an additive-containing resin molded article 50 in which the additive 6 is bonded to the polymer molecules through an ester linkage or an amide linkage.

10 Claims, 3 Drawing Sheets

ADDITIVE-CONTAINING MOLDED RESIN AND PROCESS FOR PRODUCING THE SAME

TECHNICAL FIELD

The present invention relates to additive-containing resin molded articles which do not suffer from exudation or vaporization of the additive or reduction in molecular weight due to reaction between a polyester resin and the additive and to a process for producing the same.

BACKGROUND ART

Thermoplastic polyester resins are superior in strength and the like but inferior in weather resistance and stain resistance. In the manufacture of constructive materials and other molded articles by melt molding a polyester resin, additives such as an ultraviolet absorber and a stainproofing agent are mixed into the polyester resin to improve the weather resistance or stain resistance.

The problem of the resin molded articles having an additive physically incorporated therein as mentioned above is that the additive exudes on the surface and vaporizes with time so that weather resistance or stain resistance is not maintained over a long period of time.

To overcome this problem, polymerized ultraviolet absorbers, etc. that hardly vaporize have been developed. However, polymeric additives sometimes have poor compatibility with polyester resins or sometimes cause transparency reduction or coloration.

The present inventors had developed an additive-containing resin molded article obtained by incorporating a mono-functional additive having one functional group, such as a carboxyl group or a hydroxyl group, at the molecular terminal thereof into a polyester resin and allowing the additive to react with the polymer molecules to be bonded thereto. Because the additive is fixedly bonded to the polymer molecules, the additive-containing resin molded article is free from exudation or vaporization of the additive and therefore sustains the action of the additive for an extended period of time.

However, because the additive used in the above-described additive-containing resin molded article is mono-functional, when one molecule of the additive reacts with one polymer molecule of a polyester resin through, for example, an ester linkage, the polymer molecule is divided into a polymer molecule having the additive molecule bonded to one end thereof and a polymer molecule having no additive bonded.

It almost all molecules of a polyester resin and the additive molecules react to each other, the average molecular weight of the polyester resin is reduced approximately by half. As a result, the mechanical strength and other various physical properties of the resultant additive-containing resin molded article show considerable reductions. The reductions in physical properties due to molecular weight reduction cannot be negligible degree because they become conspicuous as the content or conversion of the reaction of the additive increases.

The present invention has been completed under the above circumstances. An object of the present invention is to provide an additive-containing resin molded article which suffers from little exudation or vaporization of the additive and retains the effect of the additive for a long period of time and also which has little reduction in various physical properties due to a reduction in molecular weight of a polyester resin and a process for producing the same.

DISCLOSURE OF THE INVENTION

The additive-containing resin molded article of the invention which accomplishes the above object is characterized in that a bi- or multi-functional additive having one or two or more of a functional hydroxyl group, carboxyl group, amino group, and ester bond is present in a molded article comprising a thermoplastic polyester resin in a bonded form to the polymer molecules of the polyester resin.

Because the additive is fixedly bonded to the polymer molecules, the additive-containing resin molded article is free from exudation or vaporization of the additive from the surface and therefore sustains the action of the additive for an extended period of time.

Because the additive is bi- or multi-functional, it is less causative of molecular weight reduction of the polyester resin. For example, as depicted as a conceptual scheme in FIG. 1, when a molecule M of a bi-functional additive reacts with two polymer molecules P, P of a polyester resin at the ester linkage, there are produced a polymer molecule $P_1$ having therein the additive molecule M and two polymer molecules $P_2$, $P_2$ split by reaction. Therefore, even if the additive molecules react with almost all the polymer molecules of a polyester resin, a reduction in average molecular weight of the polyester resin is limited to about ⅔. Likewise, where tri-functional additive molecules react with almost all the polymer molecules of a polyester resin, the average molecular weight of the polyester resin is reduced only to about ¾. Thus the reduction in average molecular weight of a polyester resin caused by the reaction with a bi- or multi-functional additive is less than that caused by the reaction with a mono-functional additive, and resultant reductions in various physical properties are therefore suppressed.

The above-described additive-containing resin molded article can be produced by the production process of the present invention which is characterized in that when a thermoplastic polyester resin is melt-molded, a bi- or multi-functional additive having one or two or more of a functional hydroxyl group, carboxyl group, amino group, and ester bond is added and allowed to react with polymer molecules of the molten polyester resin. The reaction can be carried out by utilizing conventional methods.

The reaction types between the polymer molecules and the additive include alcoholysis (the reaction of additives having a hydroxyl group), acidolysis (the reaction of additives having a carboxyl group), aminolysis (the reaction of additives having an amino group), and transesterification (the reaction of additives having an ester bond). It is considered that the additive is fixed to the polymer molecule through an ester linkage in the case of acidolysis, alcoholysis or transesterification and through an amide linkage in the case of aminolysis.

When the additive bonds to polymer molecules in this way, the polymer molecules are cut to reduce its molecular weight, but since the additive is bi- or multi-functional as mentioned above, the molecular weight reduction is smaller than that caused by a mono-functional additive.

Another additive-containing resin molded article according to the present invention is characterized by being an integral laminate composed of an additive-containing layer wherein a bi- or multi-functional additive having one or two or more of a functional hydroxyl group, carboxyl group, amino group, and ester bond is present in a bonded form to the polymer molecules of a thermoplastic polyester resin, and a thermoplastic resin layer wherein the additive in the bonded form to the polymer molecules is not present.

The thermoplastic resin which can be used in the above-described thermoplastic resin layer is not particularly limited and includes not only the polyester resin described below but also a vinyl chloride resin, polypropylene, polyethylene, an acrylic resin, an ABS resin, and polystyrene. The thermoplastic resin layer can contain the above-described bi- or multi-functional additive as long as the additive is not bonded to the polymer molecules.

The above-described molded article is also free from exudation and vaporization of the additive and enjoys the effect of the additive for an extended period of time because the additive in the additive-containing layer is fixedly bonded to the polymer molecules. Further, as the thermoplastic resin layer does not need to contain the additive, the additive to be used can be saved. Furthermore, not only because the molecular weight reduction of the polyester resin in the additive-containing layer is suppressed but because the thermoplastic resin layer has undergone no molecular weight reduction which might have been caused it reacted with the additive, the reductions of the molded article as a whole in mechanical strength and other physical properties are extremely small.

The additive-containing resin molded article having such a laminate structure can be produced by another production process of the present invention which is characterized in that when a thermoplastic resin and a thermoplastic polyester resin are melted and co-extruded, the above-described bi- or multi-functional additive is added to the polyester resin and allowed to react with the polymer molecules of the molten polyester resin. The reaction types and the bonding types between the additive and polymer molecules are as described previously.

In Figures, numerals represent the following. 1: melt extruder; 1a: hopper for resin feed; 1b: hopper for additive feed; 1c: screw; 1d: molding die; 5: polyester resin; 6: additive; 7: additive-containing resin molded article; 7a: additive-containing layer; 7b: thermoplastic resin layer; 10: co-extruder; 10a: hopper of co-extruder; 10b: extruder for lower layer; 10c: hopper of extruder for upper layer; 10d: extruder for upper layer; 10e: co-extrusion die; 50: additive-containing resin molded article.

BEST MODE FOR CARRYING OUT THE INVENTION

The present invention will further be described with reference to specific embodiments of the invention, but the present invention should not be construed as being limited to the following embodiments. Accordingly, the following description about the polyester resins, additives, and the like applies to the other embodiments of the present invention.

The terminology "average molecular weight" as used herein means a viscosity-average molecular weight unless otherwise noted.

Figure 1:
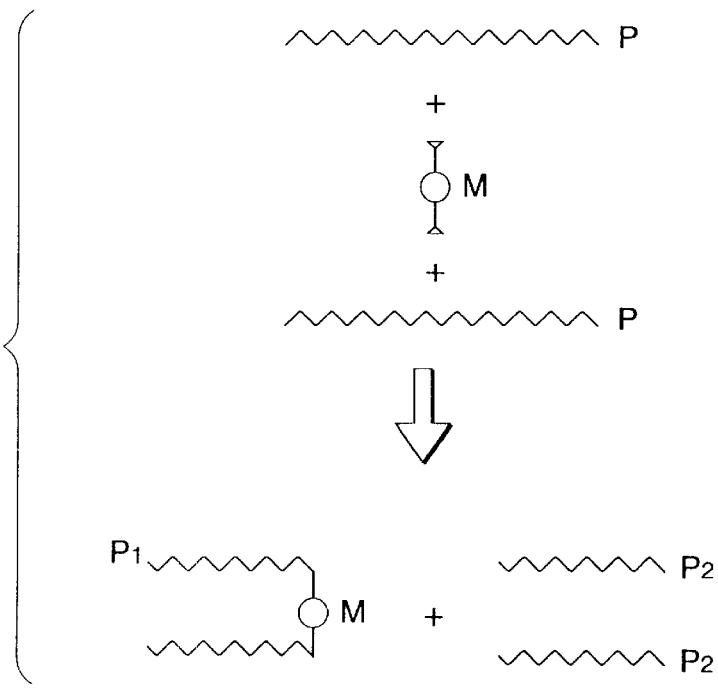
FIG. 1 is a schematic illustration explaining the concept of the reaction between the molecule of a bi-functional additive and polymer molecules of a polyester resin.
Figure 2:
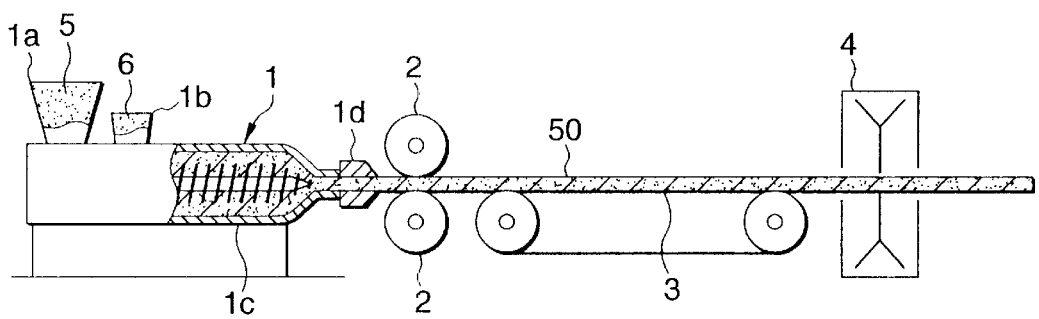
FIG. 2 is a schematic illustration showing one embodiment for carrying out the production process of the present invention.

FIG. 2 is a schematic illustration showing one embodiment of the production process of the present invention, in which an example for producing a molded plate (resin plate) of an additive-containing polyester resin is shown.

In FIG. 2, numeral 1 is a melt extruder; 1a, a hopper for resin feed, provided on the rear of the extruder; 1b, a hopper for additive feed, provided in the middle of the extruder; 1c, a screw in the extruder; 1d, a molding die provided at the head of the extruder; 2, a pair of chill rolls; 3, a conveyor belt; and 4, a cutter.

In this embodiment, the thermoplastic polyester resin 5, a starting material, that has been dried by preheating is fed from the hopper 1a at the rear of the extruder into the extruder 1 and melt-kneaded by the screw 1c under heating at or above the melting temperature (not higher than the decomposition temperature). The bi- or multi-functional additive 6 having one or two or more of a functional hydroxyl group, carboxyl group, amino group and ester bond is fed from the hopper 1b of the extruder. The polyester resin 5 and the additive 6, which are in the molten state, are uniformly kneaded together by the screw 1c and extruded through the die 1d into a plate.

While kneaded with the polyester resin 5 within the extruder 1, the additive 6 is allowed to react to the ester linkage of the polymer molecules of the polyester resin 5 and fixedly bonded thereto. As stated above, the reaction mode is alcoholysis, acidolysis, aminolysis or transesterification where the additive 6 has a functional hydroxyl group, carboxyl group, amino group or ester bond, respectively. In the case of acidolysis, alcoholysis or transesterification, the additive 6 is considered to be bonded to the polymer molecule through an ester linkage. In the case of aminolysis, it is considered that the additive 6 is bonded to the polymer molecule through an amide linkage.

The molded article 50, which is the plate of the polyester resin extruded from the die 1d, is taken up while being cooled through the pair of chill rolls 2, 2, carried on the conveyor belt 3 to the cutter 4, where it is cut to length.

The additive-containing polyester resin plate (molded article) 50 produced by the above-mentioned process has the additive 6 fixed to the polymer molecules of the polyester resin 5 by bonding and suffers from no exudation nor vaporization of the additive 6. Therefore the effect of the additive 6 is sustained for a long period of time. Because the additive 6 bonded to the polymer molecules is finely dispersed on a molecular level, the dispersed particles of the additive 6 hardly refract or scatter transmitted light, bringing about no appreciable reduction in transparency, even if the light refractive index of the dispersed particles of the additive 6 is different from that of the polyester resin.

Although the additive-containing polyester resin plate 50 has a reduced average molecular weight as a result of the reaction between the polymer molecules and the additive 6, the degree of the molecular weight reduction is much smaller than that resulting from the reaction with a mono-functional additive as described previously because the additive 6 is bi- or multi-functional. Therefore, the reductions in mechanical strength and other various physical properties of the resin plate 50 due to molecular weight reduction are slight.

The thermoplastic polyester resin 5 used as a raw material includes those having a relatively high melting temperature and ready to react with the additive 6, such as polycarbonate, polyarylate, polycaprolactone, polyethylene terephthalate, polybutylene terephthalate, polydimethylcyclohexane terephthalate, and copolymers or polymer blends comprising two or more of these polymers. The copolymers or polymer blends typically include copolymers of polycarbonate and polyarylate, copolymers of polycarbonate and polyethylene terephthalate, copolymers of polyethylene terephthalate and polybutylene terephthalate, and polymer blends of polycarbonate and polyethylene terephthalate. Copolymers or polymer blends comprising one or more of the above-described polymers and other polymers are also employable. Typical examples of the copolymers or polymer blends comprising one or more of the above polymers and other polymers are copolymers or polymer blends of polycarbonate and polypropylene.

The above-described polyester resins preferably have a viscosity-average molecular weight of from 10,000 to 100,000, still preferably from 25,000 to 71,000.

It is essential that the additive 6 should be an additive having bi- or multi-functionality containing one or two or more of a functional hydroxyl group, carboxyl group, amino group, and ester bond. If a mono-functional additive is used, the polyester resin 5 undergoes appreciable reduction in molecular weight as stated above. If an additive having other functional groups is used, it does not react with a polyester resin. The object of the present invention is not achieved in either case.

The bi- or multi-functional additive 6 used in the invention can have two or more functional groups of the same kind selected from a functional hydroxyl group, carboxyl group, amino group, and ester bond (e.g., two or more hydroxyl groups) or two or more kinds of functional groups (e.g., totally two or more of hydroxy group and carboxyl group).

Typical examples of preferred additives 6 include the following ultraviolet absorbers, flame retardants, stainproofing agents, antioxidants, and antistatic agents.

Ultraviolet Absorbers (1) 2,2'-Methylenebis-[4-(hydroxyethyl)-6-(2H-benzotriazol-2-yl)phenol] having two functional hydroxyl groups, represented by formula (1):

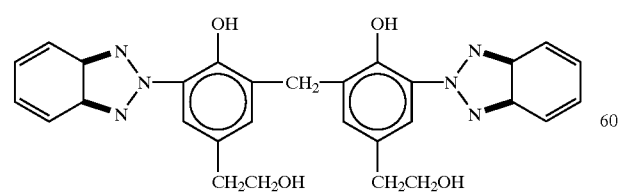

(2) 2,2'-Methylenebis-[3-(carboxyl)-6-(2H-benzotriazol-2-yl)phenol] having two functional carboxyl groups, represented by formula (2):

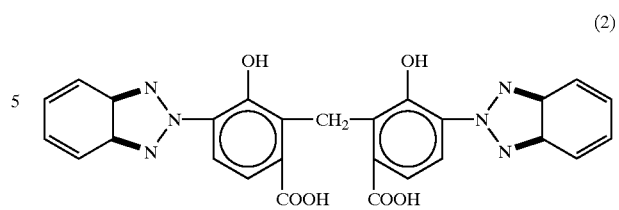

(3) 2,2'-Methylene-[(4-hydroxyethyl-4'-carboxyl)-6,6'-(2H-benzotriazol-2-yl)phenol] having a functional hydroxyl group and a functional carboxyl group, represented by formula (3):

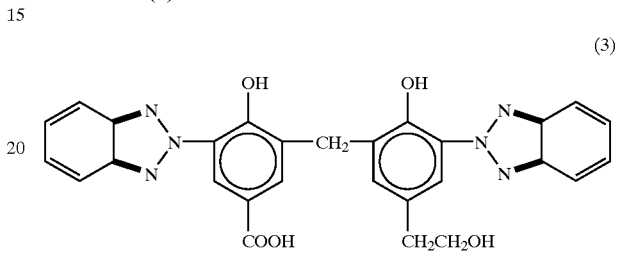

(4) 2,2'-Methylenebis-[(4-hydroxyoctyl)-6-(2H-benzotriazol-2-yl)phenol], represented by formula (4):

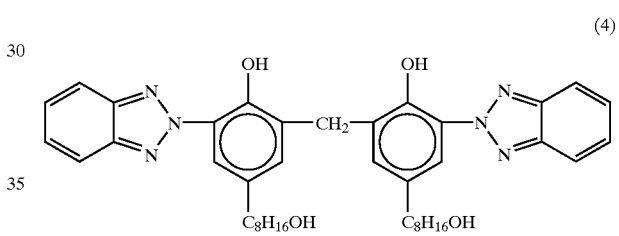

Flame Retardants (1) Dibutylbishydroxypropyl pyrophosphate having two functional hydroxyl groups, represented by formula (5):

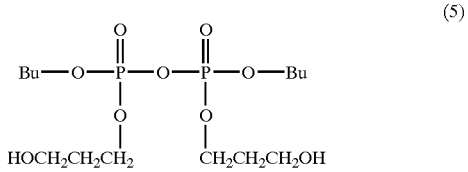

wherein Bu represents a butyl group.

(2) Dibutyltrishydroxypropyl triphosphate having three functional hydroxyl groups, represented by formula (6):

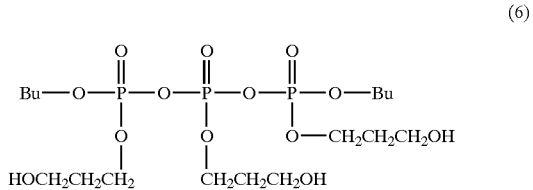

wherein Bu represents a butyl group.

(3) Phenyl-bis(2-methacryloyloxyethyl) phosphate having two ester bonds, represented by formula (7):

(7)

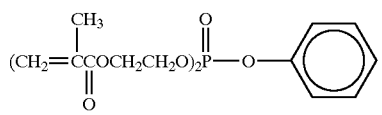

Stainproofing Agents
(1) α,ω-Diaminopolydimethylsiloxane having two functional amino groups, represented by formula (8):

(8)

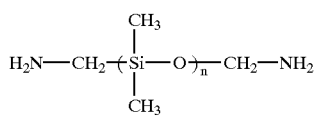

(2) Fluorinated bisphenol A having two functional hydroxyl groups, represented by formula (9):

(9)

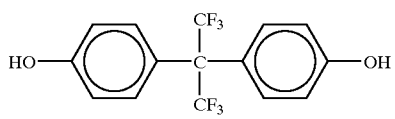

Antioxidants
Bis(4-hydroxyethylphenyl)amine, represented by formula (10):

(10)

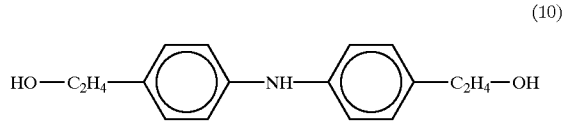

Antistatic Agents
(1) Stearoamidopropyldimethyl-β-hydroxyethylammonium dihydrogen phosphate
(2) N,N-Bis(2-hydroxyethyl)-N-(3-dodecyloxy-2-hydroxypropyl)methylammonium methosulfate In addition to the additives shown above, various additives having bi- or multi-functionality containing one or two or more of a functional hydroxyl group, carboxyl group, amino group, and ester bond can be used, such as light stabilizers, heat stabilizers, antioxidants, plasticizers, nucleating agents, antistatic agents, lubricants, internal parting agents, anti-fogging agents, anti-mist agents, colorants, antibacterials, antifungals, and the like.

The content of the additive 6 is not particularly limited and can be decided appropriately according to the kind. A generally recommended amount of the additive 6 is 0.01 to 15.0 parts by weight, preferably 0.5 to 10.0 parts by weight, per 100 parts by weight of the polyester resin. In some cases an additive which does not have a functional group or ester bond reactive with the polyester resin may be used in combination.

The reaction between the additive and the polyester resin takes place on heating the polyester resin to a melting temperature or higher but not higher than the decomposition temperature to melt the polyester resin. Accordingly in using, for example, polycarbonate as a polyester resin, it is melted by heating in the extruder 1 at about 220 to 350° C. In using polydimethylcyclohexane terephthalate, it is melted by heating to about 190 to 300° C.

While the reaction rate somewhat varies depending on the kind of the functional group or the ester bond of the additive or the kind of the polyester resin, the reaction usually comes to a substantial end in about 1 to 15 minutes. For example, in carrying out extrusion to obtain the resin plate 50 as in this embodiment, the additive 6 is fed to the molten polyester resin 5. in the extruder 1 and kneaded together for about 1 to 15 minutes before the resin is extruded from the die 1d at the head. It is important to decide the position of the hopper 1b for additive feed, the screw design, and other extrusion conditions so as to let the reaction proceed sufficiently. In this case, a twin-screw extruder or a kneader is suitably used.

While in this embodiment the polyester resin 5 and the additive 6 are separately put in the extruder 1 from the respective hoppers 1a and 1b, the manner of feeding the additive is a matter of choice, for example, both of them may be fed together from the hopper 1a, or a mixture of them may be fed from the hopper 1b in adequate portions.

While in the above embodiment the polyester resin. having reacted with the additive is extruded in a single layer through the die 1d into a resin plate, it is a matter of course that extruded products having various contours including sheets, films and profiles, etc. can be produced by changing the die 1d, etc. Resin molded articles having various three-dimensional shapes which are free from exudation or vaporization of the additive can also be obtained by injection molding by incorporating the additive into the molten polyester resin before being injected into a mold of an injection molding machine.

Figure 3:
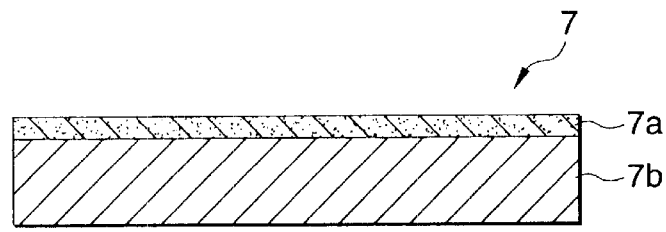
FIG. 3 is a cross section of an embodiment of the additive-containing resin molded article according to the present invention.
Figure 4:
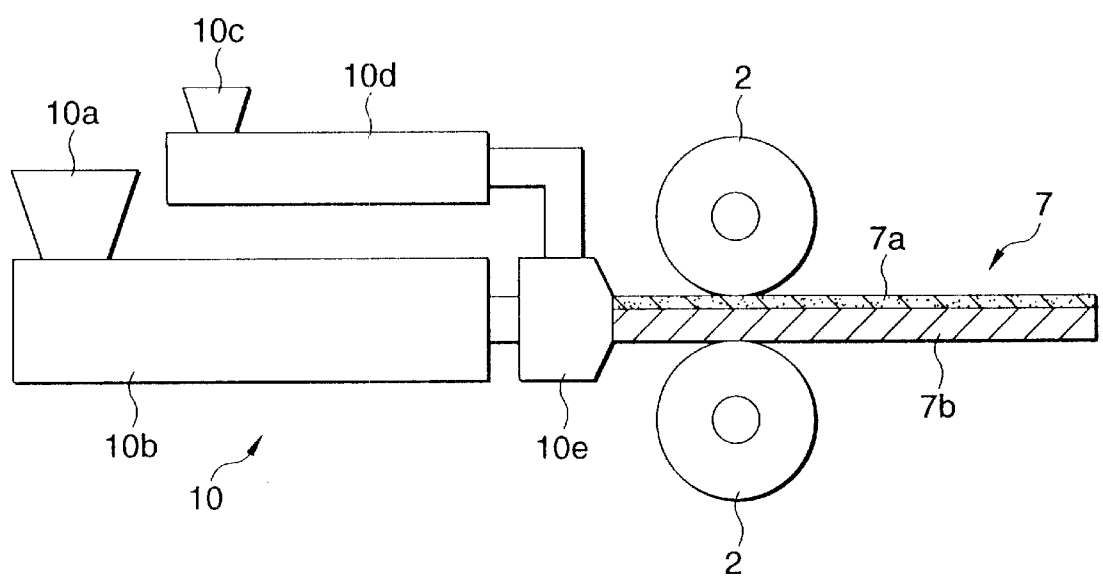
FIG. 4 is a schematic illustration showing another embodiment for carrying out the production process of the present invention.

FIG. 3 is a cross section of another embodiment of the additive-containing resin molded article according to the present invention, and FIG. 4 is a schematic illustration of the process for producing the same.

The additive-containing resin molded article 7 is a molded plate having a double-layered laminate structure in which an additive-containing layer 7a and a thermoplastic resin layer 7b containing no additive are unified into an integral laminate.

It is considered that the additive-containing layer 7a is a layer in which the above-described bi- or multi-functional additive is present in a thermoplastic polyester resin in a bonded form to the polymer molecules through an ester linkage or an amide linkage, while the thermoplastic resin layer 7b is a layer comprising a polyester resin which may be the same as or different from the polyester resin of the additive-containing layer 7a or other thermoplastic resins which are compatible with the polyester resin of the additive-containing layer 7a. The other thermoplastic resins include, for example, polymethyl methacrylate.

The molded article 7 having such a double-layered laminate structure shows functionality on one side of the additive-containing layer 7a. While the additive-containing layer 7a in FIG. 3 is depicted with a large thickness, as small a thickness as about 30 to 100 μm would be enough to form the additive-containing layer 7a in obtaining, for example, a molded plate having satisfactory weather resistance or stain resistance in which the above-described bi- or multi-functional ultraviolet absorber or stainproofing agent is incorporated into the additive-containing layer 7a. The thickness of the thermoplastic resin layer 7b is selected so as to give strength meeting the use of the molded plate 7.

Because the molded article 7 contains the additive only in the additive-containing layer 7a but not in the thermoplastic resin layer 7b, the amount of the additive to be used can be decreased greatly. Because the additive is fixedly bonded to the polymer molecules of the polyester resin, the additive in the additive-containing layer 7a does not exudate nor vaporize and therefore sustains its effect for a long time. Not only because the molecular weight reduction of the polyester resin in the additive-containing layer 7a has been suppressed but also because the resin in the thermoplastic resin layer 7b has not undergone molecular weight reduction which might have been caused by reaction with the additive, reductions of the molded article as a whole in mechanical strength and other physical properties are extremely small.

The molded article 7 having the double-layered laminate structure can be produced by use of the co-extruder 10 shown in FIG. 4. A thermoplastic resin is fed from the hopper 10a of the co-extruder 10 into the extruder 10b for lower layer and melted. On the other hand, a blend of the additive and the polyester resin is fed from the hopper 10c into the extruder 10d for upper layer, where the polyester resin is heat-melted and allowed to react with the additive. The molten thermoplastic resin and the polyester resin having reacted with the additive are co-extruded from the respective extruders 10b and 10d through the co-extrusion die 10e to obtain a molded plate 7 having the lower thermoplastic resin layer 7b and the upper additive-containing layer 7a unified. The molded plate 7 having the double-layered laminate structure is taken up while being cooled between the pair of chilled rolls 2, 2, transferred by the conveyor belt 3 to the cutter 4, and cut to length in the same manner as in the process shown in FIG. 2.

While the molded article 7 having the laminate structure shown in FIG. 3 is made up of the thermoplastic resin layer 7b integrally laminated on one side (upper side) thereof with the additive-containing layer 7a, the molded article can have a three-layer structure comprising the thermoplastic resin layer 7b integrally laminated on both sides thereof with the additive-containing layer 7a. Conversely, the molded article can have a three-layer structure having the additive-containing layer 7a integrally laminated on both sides thereof with the thermoplastic resin layer 7b. Needless to say, these three-layered molded articles can easily be produced by use of a three-layer co-extruder having an extruder for upper layer, an extruder for intermediate layer, and an extruder for lower layer. It is also possible to produce an additive-containing resin molded article of plate form comprising two or more layers by hot pressing on a pressing machine a desired combination of a thermoplastic resin molded article containing no additive and an additive-containing resin molded article prepared by extrusion. Further, an additive-containing resin molded article and a thermoplastic resin molded article containing no additive can be combined by extrusion lamination to obtain an additive-containing resin molded article comprising two or more layers. It is of course possible to superpose a plurality of additive-containing layers 7a different in additive content or kind of the polyester resin or a plurality of thermoplastic resin layers 7b different in kind of the polyester resin to make a multilayered molded article.

Further specific examples of the present invention are shown below.

EXAMPLES

The present invention will be illustrated in greater detail by way of Examples and Comparative Examples, but it should be understood that the present invention is not limited thereto as far as it does not exceed the gist of the present invention.

In what follows, Mv represents an average molecular weight.

Example 1

Polycarbonate was used as a polyester resin. An ultraviolet absorber comprising 2,2'methylenebis-[4-(hydroxyethyl)-6-(2H-benzotriazol-2-yl)phenol] having two functional hydroxyl groups as represented by formula (1) was previously dry blended as an additive into the polycarbonate in a ratio of 5.0 parts by weight per 100 parts by weight of the polycarbonate.

The blend was fed to a twin-screw extruder and melt-kneaded by heating at 270° C. to allow the polycarbonate and the ultraviolet absorber to react for about 10 minutes and then extruded through the die of the extruder into a 3 mm thick ultraviolet absorber-containing polycarbonate resin plate as a test piece. The reaction between the polycarbonate and the ultraviolet absorber is as represented by the following formula (11):

Formula (11):

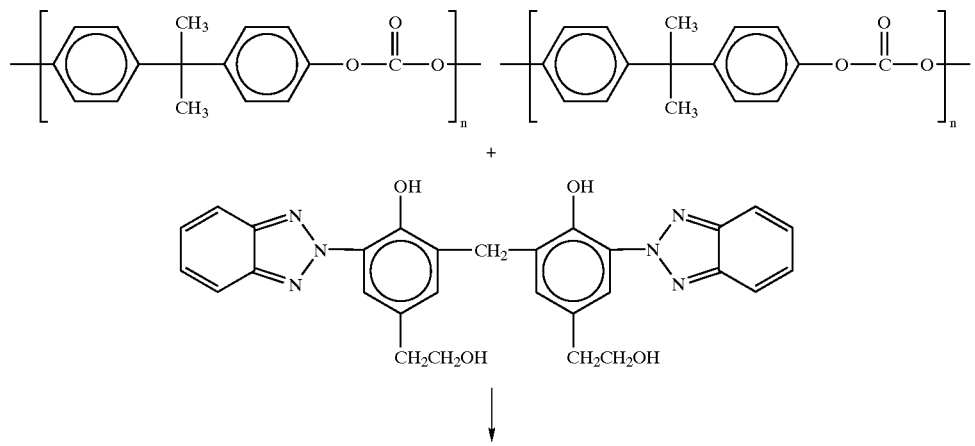

-continued

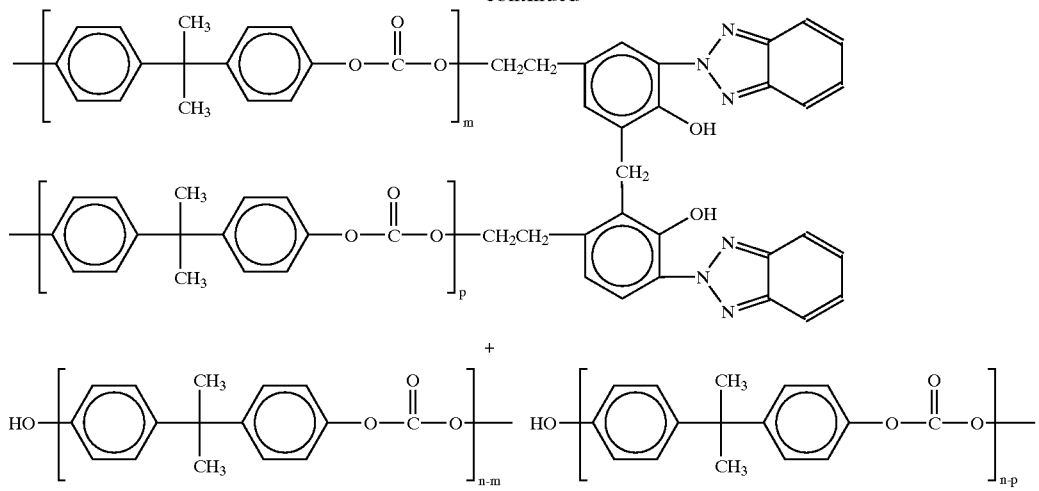

The test piece was examined by the test method described below to determine the ratio of the amount of the ultraviolet absorber in a bonded form through an ester linkage and the amount of the ultraviolet absorber that was present in an unreacted form (conversion of the reaction). As a result, it was found that the ultraviolet absorber had undergone a transesterification reaction at a conversion of about 40%.

Test Method for Measuring Conversion of Reaction

Figure 5:
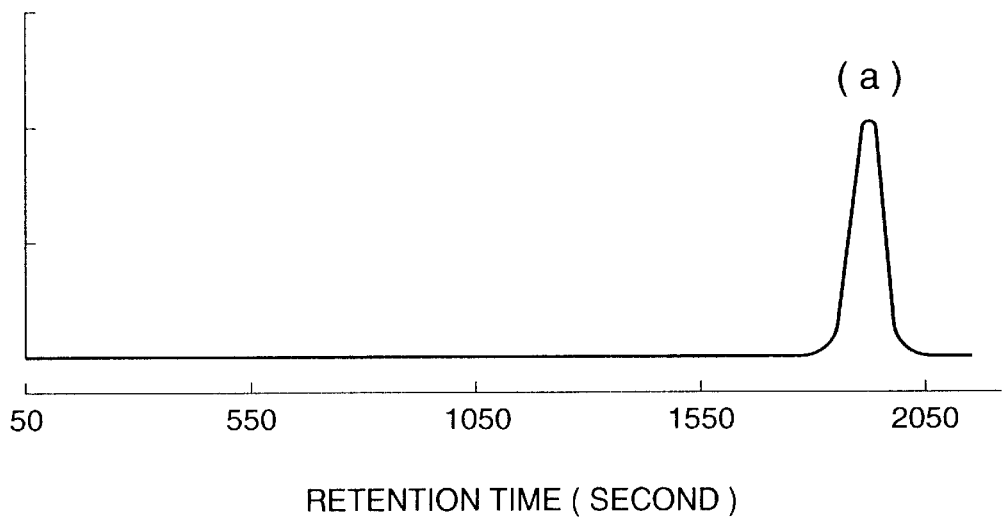
FIG. 5 is a molecular weight distribution curve of a blend of polycarbonate and 2,2'-methylenebis-[4-(hydroxyethyl)-6-(2H-benzotriazol-2-yl)phenol] measured by GPC.
Figure 6:
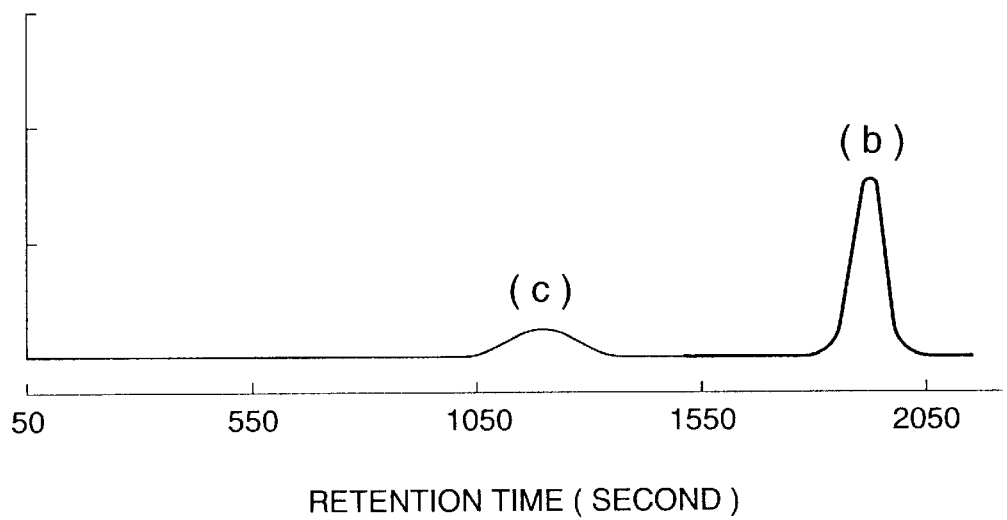
FIG. 6 is a molecular weight distribution curve of a test piece obtained in Example 1 measured by GPC.

The conversion of reaction was confirmed with GPC (gel-permeation chromatography) equipment. The ultraviolet absorber used in Example 1, 2,2'-methylenebis-[4 (hydroxyethyl)-6-(2H-benzotriazol-2-yl)phenol], has a maximum UV absorption wavelength ($\lambda_{max}$) at 347 nm. Accordingly, the detection wavelength of the UV detector of GPC was set at 347 nm, at which polycarbonate is not detected. For comparison, they were blended in a solvent in the same compounding ratio to prepare a comparative sample in which no reaction had taken place. The molecular weight distribution curve of the comparative sample as measured by GPC is shown in FIG. 5, wherein the peak (a) of the ultraviolet absorber appears in the low-molecular weight side (the right-hand side on the abscissa). The GPC molecular weight distribution curve of the test piece of Example 1 is shown in FIG. 6. The peak (b) appears at the same elution time as the peak (a) of the unreacted ultraviolet absorber but with a lower detection intensity, and the decrease of the peak (b) appears as the peak (c) as shifted to the high-molecular side (the left-hand side on the abscissa). In other words, the ultraviolet absorber gains a high-molecular weight by the reaction with the polycarbonate, which results in the shift of the peak. The peak (c) represents the reacted part, and the peak (b) the unreacted part. The conversion of reaction can be obtained from the area ratio of the peak (b) and the peak (c). Then the test piece of Example 1 was purified to remove the unreacted ultraviolet absorber and subjected to FT-IR or $^3$H- or $^{13}$C-NMR analysis to confirm that the ultraviolet absorber had been bonded through an ester linkage, which provides confirmation that the peak (c) is not ascribed to homopolymerization of the ultraviolet absorber.

The average molecular weight as measured on the test piece by the following method was 27800. That is, the average molecular weight was calculated on a polystyrene conversion from the molecular weight distribution curve prepared by GPC (gel-permeation chromatography).

Further, 3 mm thick test pieces of the ultraviolet absorber-containing polycarbonate resin plate were prepared in the same manner as described above, except that the conversion of reaction was changed to about 25%, about 50%, about 75%, and about 100% by adjusting the extrusion temperature within a range of 220 to 350° C. and adjusting the reaction time within a range of 1 to 30 minutes. The average molecular weight of each test piece was measured in the same manner as described above. In addition, the test pieces were subjected to an Izod impact test according to JIS-7110 and a tensile test according to JIS-7113. The results obtained are shown in Table 1 hereinafter given. For reference, the average molecular weight of a 3 mm thick polycarbonate resin plate obtained by extruding the polycarbonate resin alone under the same conditions as described above was 30000.

Furthermore, test pieces of a 0.1 mm thick ultraviolet absorber-containing polycarbonate resin film (conversion of reaction: about 40%) were prepared in the same manner as described above, except for changing the die of the extruder. The resulting film test pieces were subjected to an accelerated exposure test to examine the relationships between the exposure time and the change of yellowness index ($\Delta$YI) and the haze (%). The results obtained are shown in Table 2 hereinafter given. The accelerated exposure test was carried out by exposing in a xenon weatherometer (manufactured by Atlas) for 1000 hours, 2000 hours or 3000 hours. The $\Delta$YI was obtained by measurement with $\Sigma$90 Color Measuring System (manufactured by Nippon Densyoku K.K.).

Comparative Example 1

A comparative test piece of a 3 mm thick ultraviolet absorber-containing resin plate having a conversion of reaction of about 40% was prepared in the same manner as in Example 1, except for using, as a mono-functional ultraviolet absorber, 2-(2'-hydroxy-5'-hydroxyethylphenyl) benzotriazole represented by formula (12) shown below and changing the heating temperature and the reaction time to 285° C. and about 8 minutes.

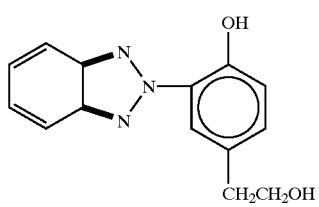

(12)

The average molecular weight, measured on the comparative test piece in the same manner as in Example 1, was 24200, which shows a decrease by about 3000 from that of the test piece of Example 1. This is because the ultraviolet absorber was mono-functional so that the polymer molecules were severed on bonding.

Further, comparative test pieces were prepared from 3 mm thick ultraviolet absorber-containing polycarbonate resin plates whose conversion of the reaction was about 25%, about 50%, about 75% or about 100% which were obtained by adjusting the extrusion temperature within a range of 220 to 350° C. and adjusting the reaction time within a range of 2 to 30 minutes. The average molecular weight of each test piece was measured. In addition, the test pieces were subjected to an Izod impact test according to JIS-7110 and a tensile test according to JIS-7113. The results obtained are shown in Table 1 below.

Furthermore, comparative test pieces of a 0.1 mm thick ultraviolet absorber-containing polycarbonate resin film (conversion of the reaction: about 40%) were prepared in the same manner as described above, except for changing the die of the extruder. The resulting comparative test pieces were subjected to an accelerated exposure test in the same manner as in Example 1 to examine the relationships between the exposure time and the change of yellowness index ($\Delta YI$) or the haze (%). The results obtained are shown in Table 2 below.

Example 2

Polydimethylcyclohexane terephthalate (copolymer) was used as a polyester resin. An ultraviolet absorber comprising 2,2'-methylenebis-[4-(hydroxyethyl)-6-(2H-benzotriazol-2-yl)phenol] represented by formula (1) was previously dry blended as an additive in a ratio of 5.0 parts by weight per 100 parts by weight of polydimethylcyclohexane terephthalate.

The blend was fed to a twin-screw extruder and melt-kneaded by heating at 210° C. to allow the polydimethylcyclohexane terephthalate and the ultraviolet absorber to react for about 10 minutes and then extruded through the die of the extruder into a 3 mm thick ultraviolet absorber-containing polydimethylcyclohexane terephthalate resin plate as a test piece.

The ratio of the amount of the ultraviolet absorber in an ester-bonded form and the amount of the ultraviolet absorber that was present in an unreacted form (conversion of the reaction) was examined on the test piece in the same manner as in Example 1. As a result, it was found that the ultraviolet absorber had undergone a transesterification reaction at a conversion of the reaction of about 30%. The average molecular weight was 30500 as measured in the same manner as in Example 1.

Further, 3 mm thick test pieces of ultraviolet absorber-containing polydimethylcyclohexane terephthalate resin plates whose conversion of the reaction was about 25%, about 50%, about 75% or about 100% were prepared by the above-described process wherein the extrusion temperature was adjusted within a range of 180 to 280° C. and the reaction time was adjusted within a range of 1 to 30 minutes. The average molecular weight of each test piece was measured. In addition, the test pieces were subjected to an Izod impact test according to JIS-7110 and a tensile test according to JIS-7113. The results obtained are shown in Table 3 hereinafter given. For reference, the average molecular weight of a 3 mm thick resin plate obtained by extruding the polydimethylcyclohexane terephthalate resin alone under the same conditions as described above was 33200.

TABLE 1

| Conversion of the Reaction | Example 1 | | | Comparative Example 1 | | |
| --- | --- | --- | --- | --- | --- | --- |
| | Mv | Impact Strength[*1] | Tensile Strength[*2] | Mv | Impact Strength[*1] | Tensile Strength[*2] |
| ca. 25% | 28600 | 88 | 750 | 26500 | 81 | 690 |
| ca. 50% | 27300 | 85 | 690 | 23100 | 77 | 640 |
| ca. 75% | 24900 | 79 | 670 | 19500 | 74 | 580 |
| ca. 100% | 20400 | 75 | 600 | 14900 | 65 | 490 |

[*1]: kgf·cm/cm$^2$
[*2]: kgf/cm$^2$

TABLE 2

| | Example 1 | | Comparative Example 1 | |
| --- | --- | --- | --- | --- |
| Exposure Time (hr) | Change of Yellowness Index ($\Delta YI$) | Haze (%) | Change of Yellowness Index ($\Delta YI$) | Haze (%) |
| 0 | — | 0.4 | — | 0.5 |
| 1000 | 0.3 | 2.2 | 2.8 | 6.5 |
| 2000 | 1.4 | 7.1 | 3.5 | 11.9 |
| 3000 | 2.5 | 9.7 | 6.9 | 19.8 |

Furthermore, test pieces of a 0.1 mm thick ultraviolet absorber-containing polydimethylcyclohexane terephthalate resin film (conversion of the reaction: about 30%) were prepared in the same manner as described above, except for changing the die of the extruder. The resulting film test pieces were subjected to the same accelerated exposure test as in Example 1 to examine the relationships between the exposure time and the change of yellowness index ($\Delta YI$) or the haze (%). The results obtained are shown in Table 4 hereinafter given.

Comparative Example 2

Comparative test pieces of a 3 mm thick ultraviolet absorber-containing polydimethylcyclohexane terephthalate resin plate having a conversion of reaction of about 30% were prepared in the same manner as in Example 1, except for using, as a mono-functional ultraviolet absorber, 2-(2'-hydroxy-5'-hydroxyethylphenyl)benzotriazole represented by formula (12) and changing the heating temperature and the reaction time to 225° C. and about 8 minutes. The average molecular weight of the comparative test piece was 27900, showing a reduction from that of the test piece of Example 2.

Further, 3 mm thick test comparative pieces of ultraviolet absorber-containing polydimethylcyclohexane terephthalate resin plates whose conversion of the reaction was about 25%, about 50%, about 75% or about 100% were prepared by the above-described process wherein the extrusion temperature was adjusted within a range of 180 to 280° C. and the reaction time was adjusted within a range of 2 to 30 minutes. The average molecular weight of each test piece was measured. In addition, the test pieces were subjected to an Izod impact test according to JIS-7110 and a tensile test according to JIS-7113. The results obtained are shown in Table 3 below.

Furthermore, test pieces of a 0.1 mm thick ultraviolet absorber-containing polydimethylcyclohexane terephthalate resin film (conversion of the reaction: about 30%) were prepared in the same manner, except for changing the die of the extruder. The resulting film test pieces were subjected to the same accelerated exposure test in the same manner as in Example 2 to examine the relationships between the exposure time and the change of yellowness index ($\Delta$YI) or the haze (%). The results obtained are shown in Table 4 below.

The blend was fed to a twin-screw extruder and melt-kneaded by heating at 280° C. to allow the polycarbonate and the ultraviolet absorber to react for about 10 minutes and then extruded through the die of the extruder into a 3 mm thick ultraviolet absorber-containing polycarbonate resin plate as a test piece.

The ratio of the amount of the ultraviolet absorber in an ester-bonded form and the amount of the ultraviolet absorber that was present in an unreacted form (conversion of the reaction) was determined in the same manner as in Example 1. As a result, it was found that the ultraviolet absorber had undergone transesterification at a conversion of about 50%. The average molecular weight measured on the test piece was found to be 27000.

Further, 3 mm thick test pieces of ultraviolet absorber-containing polycarbonate resin plates whose conversion of the reaction was about 25%, about 50%, about 75% or about 100% were prepared by the above-described process wherein the extrusion temperature was adjusted within a range of 220 to 350° C. and the reaction time was adjusted within a range of 1 to 30 minutes. The average molecular weight of each test piece was measured in the same manner as described above. In addition, the test pieces were subjected to an Izod impact test according to JIS-7110 and a tensile test according to JIS-7113. The results obtained are shown in Table 5 hereinafter given. For reference, the average molecular weight of a 3 mm thick polycarbonate resin plate comprising the polycarbonate resin alone was 30000 as described above.

Furthermore, test pieces of a 0.1 mm thick ultraviolet absorber-containing polycarbonate resin film (conversion of

TABLE 3

| Conversion of the Reaction | Example 2 | | | Comparative Example 2 | | |
|---|---|---|---|---|---|---|
| | Mv | Impact Strength[*1] | Tensile Strength[*2] | Mv | Impact Strength[*1] | Tensile Strength[*2] |
| ca. 25% | 31000 | 9 | 620 | 28500 | 9 | 600 |
| ca. 50% | 29200 | 9 | 590 | 25300 | 7 | 590 |
| ca. 75% | 26300 | 8 | 580 | 21100 | 7 | 570 |
| ca. 100% | 22300 | 8 | 500 | 16000 | 5 | 400 |

[*1]: kgf · cm/cm$^2$
[*2]: kgf/cm$^2$

TABLE 4

| | Example 2 | | Comparative Example 2 | |
|---|---|---|---|---|
| Exposure Time (hr) | Change of Yellowness Index ($\Delta$YI) | Haze (%) | Change of Yellowness Index ($\Delta$YI) | Haze (%) |
| 0 | — | 0.8 | — | 0.9 |
| 1000 | 0.5 | 2.8 | 3.1 | 5.5 |
| 2000 | 1.4 | 6.9 | 4.2 | 13.1 |
| 3000 | 2.8 | 10.2 | 7.3 | 20.8 |

Example 3

Polycarbonate was used as a polyester resin. An ultraviolet absorber comprising 2,2'-methylenebis-[3-(carboxyl)-6 (2H-benzotriazol-2-yl)phenol] having two functional carboxyl groups as represented by formula (2) was previously dry blended as an additive into the polycarbonate in a ratio of 4.0 parts by weight per 100 parts by weight of the polycarbonate.

the reaction: about 50%) were prepared in the same manner as described above, except for changing the die of the extruder. The resulting film test pieces were subjected to the same accelerated exposure test as in Example 1 to examine the relationships between the exposure time and the change of yellowness index ($\Delta$YI) or the haze (%). The results obtained are shown in Table 6 hereinafter given.

Comparative Example 3

A comparative test piece of a 3 mm thick ultraviolet absorber-containing resin plate having a conversion of the reaction of about 50% was prepared in the same manner as in Example 3, except for using, as an ultraviolet absorber, mono-functional 2-(2'-hydroxy-3'-carboxyphenyl) benzotriazole represented by formula (13) shown below and changing the heating temperature and the reaction time to 290° C. and about 8 minutes.

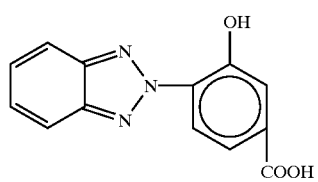

(13)

The average molecular weight measured on the comparative test piece was 23300, which shows a decrease from that of the test piece of Example 3.

Further, comparative test pieces were prepared from 3 mm thick ultraviolet absorber-containing polycarbonate resin plates whose conversion of the reaction was about 25%, about 50%, about 75% or about 100% which were obtained by adjusting the extrusion temperature within a range of 220 to 350° C. and adjusting the reaction time within a range of 2 to 30 minutes. The average molecular weight of each test piece was measured. In addition, the test pieces were subjected to an Izod impact test according to JIS-7110 and a tensile test according to JIS-7113. The results obtained are shown in Table 5 shown below.

Furthermore, comparative test pieces of a 0.1 mm thick ultraviolet absorber-containing polycarbonate resin film (conversion of reaction: about 50%) were prepared in the same manner, except for changing the die of the extruder. The resulting comparative test film were subjected to an accelerated exposure test in the same manner as in Example 3 to examine the relationships between the exposure time and the change of yellowness index ($\Delta YI$) or the haze (%). The results obtained are shown in Table 6 below.

formula (5) was previously dry blended as an additive in a ratio of 10.0 parts by weight per 100 parts by weight of the polycarbonate.

The blend was fed to a twin-screw extruder and melt-kneaded by heating at 260° C. to allow the polycarbonate and the flame retardant to react for about 10 minutes and then extruded through the die of the extruder into a 3 mm thick flame retardant-containing polycarbonate resin plate, from which test pieces were prepared.

The ratio of the amount (conversion of the reaction) of the flame retardant in an ester-bonded form and the amount of the flame retardant that was present in an unreacted form was determined in the same manner as in Example 1. As a result, it was found that the flame retardant had undergone transesterification at a conversion of about 50%. The average molecular weight measured on the test piece was found to be 20000. The oxygen index of the test piece as measured in accordance with JIS-K7201 was 22, which is indicative of satisfactory flame retardant properties.

Further, 3 mm thick test pieces of flame retardant-containing polycarbonate resin plates whose conversion of the reaction was about 25%, about 50%, about 75% or about 100% were prepared by the above process wherein the extrusion temperature was adjusted within a range of 220 to 350° C. and the reaction time was adjusted within a range of 1 to 30 minutes. The average molecular weight of each test piece was measured. In addition, the test pieces were subjected to an Izod impact test according to JIS-7110 and a tensile test according to JIS-7113. The results obtained are shown in Table 7 hereinafter given. As previously mentioned, the average molecular weight of a 3 mm thick resin plate comprising the polycarbonate resin alone was 30000.

TABLE 5

| Conversion of the Reaction | Example 3 | | | Comparative Example 3 | | |
|---|---|---|---|---|---|---|
| | Mv | Impact Strength[*1] | Tensile Strength[*2] | Mv | Impact Strength[*1] | Tensile Strength[*2] |
| ca. 25% | 28800 | 90 | 760 | 26900 | 81 | 700 |
| ca. 50% | 27000 | 85 | 700 | 23300 | 79 | 650 |
| ca. 75% | 25100 | 81 | 690 | 19900 | 75 | 600 |
| ca. 100% | 21400 | 79 | 620 | 15200 | 63 | 500 |

[*1]: $kgf \cdot cm/cm^2$
[*2]: $kgf/cm^2$

TABLE 6

| | Example 3 | | Comparative Example 3 | |
|---|---|---|---|---|
| Exposure Time (hr) | Change of Yellowness Index ($\Delta YI$) | Haze (%) | Change of Yellowness Index ($\Delta YI$) | Haze (%) |
| 0 | — | 0.4 | — | 0.5 |
| 1000 | 0.5 | 3.2 | 3.5 | 8.1 |
| 2000 | 2.0 | 9.5 | 6.2 | 13.9 |
| 3000 | 3.9 | 13.5 | 12.0 | 22.8 |

Example 4

Polycarbonate was used as a polyester resin. A flame retardant comprising dibutylbishydroxypropyl pyrophoshate having two functional hydroxyl groups as represented by Comparative Example 4

Comparative test pieces of a 3 mm thick flame retardant-containing polycarbonate resin plate having a conversion of reaction of about 50% were prepared in the same manner as in Example 4, except for using, as a flame retardant, mono-functional tributylhydroxypropyl phosphate represented by formula (14) shown below and changing the heating temperature and the reaction time to 275° C. and about 8 minutes.

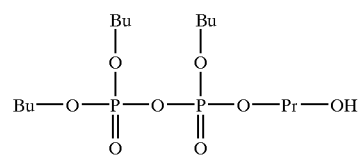

(14)

wherein Bu represents a butyl group, and Pr represents a propyl group.

The average molecular weight of the comparative test piece was 16900, showing a reduction from that of the test piece of Example 4. The oxygen index of the comparative test piece as measured in accordance with JIS-K7201 was 22, which was the same as that of the test piece of Example 4, indicating satisfactory flame retardant properties.

Further, 3 mm thick test pieces of flame retardant-containing polycarbonate resin plates whose conversion was about 25%, about 50%, about 75% or about 100% were prepared by adjusting the extrusion temperature within a range of 220 to 350° C. and adjusting the reaction time within a range of 2 to 30 minutes. The average molecular weight of each test piece was measured. In addition, the test pieces were subjected to an Izod impact test according to JIS-7110 and a tensile test according to JIS-7113. The results obtained are shown in Table 7 below.

TABLE 7

| Conversion of the Reaction | Example 4 | | | Comparative Example 4 | | |
|---|---|---|---|---|---|---|
| | Mv | Impact Strength[*1] | Tensile Strength[*2] | Mv | Impact Strength[*1] | Tensile Strength[*2] |
| ca. 25% | 27500 | 89 | 750 | 24800 | 79 | 640 |
| ca. 50% | 20000 | 79 | 630 | 16900 | 62 | 500 |
| ca. 75% | 17200 | 62 | 520 | 12300 | 58 | 480 |
| ca. 100% | 11600 | — | — | 9100 | — | — |

[*1]: $kgf \cdot cm/cm^2$
[*2]: $kgf/cm^2$

Example 5

Polycarbonate was used as a polyester resin. A stainproofing agent comprising α,ω-diaminopolydimethylsiloxane having two functional amino groups as represented by formula (8) was previously dry blended as an additive into the polycarbonate in a ratio of 2.5 parts by weight per 100 parts by weight of the polycarbonate.

The blend was fed to a twin-screw extruder and melt-kneaded by heating at 260° C. to allow the polycarbonate and the stainproofing agent to react for about 10 minutes and then extruded through the die of the extruder into a 3 mm thick stainproofing agent-containing polycarbonate resin plate, from which test pieces were prepared.

The ratio of the amount (conversion of the reaction) of the stainproofing agent in an amide-bonded form and the amount of the stainproofing agent that was present in an unreacted form was determined in the same manner as in Example 1. As a result, it was found that the stainproofing agent had been bonded through an amide linkage at a conversion of about 50%. The average molecular weight measured on the test piece was found to be 28000. The stain resistance of the test piece was evaluated in accordance with JIS-A5705. As a result, the test piece was proved to have satisfactory stain resistance equally to the comparative test piece of Comparative Example 5 hereinafter described.

Further, 3 mm thick test pieces of stainproofing agent-containing polycarbonate resin plates whose conversion was about 25%, about 50%, about 75% or about 100% were prepared by the above process wherein the extrusion temperature was adjusted within a range of 220 to 350° C. and the reaction time was adjusted within a range of 1 to 30 minutes. The average molecular weight of each test piece was measured in the same manner as described above. In addition, the test pieces were subjected to an Izod impact test according to JIS-7110 and a tensile test according to JIS-7113. The results obtained are shown in Table 8 below. As previously mentioned, the average molecular weight of a 3 mm thick resin plate comprising the polycarbonate resin alone was 30000.

Comparative Example 5

Comparative test pieces of a 3 mm thick stainproofing agent-containing polycarbonate resin plate having a conversion of reaction of about 50% were prepared in the same manner as in Example 5, except for using mono-functional α-aminopolydimethylsiloxane represented by formula (15) shown below as a stainproofing agent and changing the heating temperature and the reaction time to 275° C. and about 8 minutes.

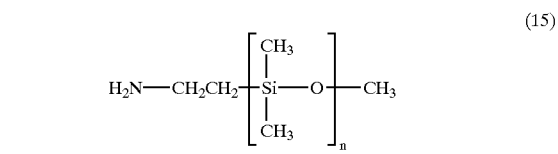
(15)

The average molecular weight of the comparative test piece was 24300, showing a reduction from that of the test piece of Example 5. The stain resistance of the comparative test piece was evaluated in accordance with JIS-A5705. As a result, the comparative test piece was proved to have satisfactory stain resistance equally to the test piece of Example 5.

Further, comparative test pieces of 3 mm thick stainproofing agent-containing polycarbonate resin plates whose conversion was about 25%, about 50%, about 75% or about 100% were prepared by adjusting the extrusion temperature within a range of 220 to 350° C. and adjusting the reaction time within a range of 2 to 30 minutes. The average molecular weight of each test piece was measured. In addition, the test pieces were subjected to an Izod impact test according to JIS-7110 and a tensile test according to JIS-7113. The results obtained are shown in Table 8 below.

TABLE 8

| Conversion of the Reaction | Example 5 | | | Comparative Example 5 | | |
|---|---|---|---|---|---|---|
| | Mv | Impact Strength[*1] | Tensile Strength[*2] | Mv | Impact Strength[*1] | Tensile Strength[*2] |
| ca. 25% | 29300 | 91 | 770 | 27300 | 81 | 700 |
| ca. 50% | 28000 | 85 | 710 | 24300 | 78 | 660 |
| ca. 75% | 26200 | 80 | 700 | 19800 | 76 | 610 |
| ca. 100% | 22300 | 78 | 640 | 14300 | 60 | 490 |

[*1]: kgf·cm/cm$^2$
[*2]: kgf/cm$^2$

Example 6

Polycarbonate was used as a polyester resin. A flame retardant comprising phenyl-bis(2-methacryloyloxyethyl) phosphate having two ester bonds as represented by formula (7) was previously dry blended as an additive in a ratio of 10.0 parts by weight per 100 parts by weight of the polycarbonate.

The blend was fed to a twin-screw extruder and melt-kneaded by heating at 260° C. to allow the polycarbonate and the flame retardant to react for about 10 minutes and then extruded through the die of the extruder into a 3 mm thick flame retardant-containing polycarbonate resin plate as a test piece.

The ratio of the amount (conversion of the reaction) of the flame retardant in an ester-bonded form and the amount of the flame retardant that was present in an unreacted form was determined in the same manner as in Example 1. As a result, it was found that the flame retardant had undergone transesterification at a conversion of about 50%. The average molecular weight measured on the test piece was found to be 21200. The oxygen index of the test piece as measured in accordance with JIS-K7201 was 21, indicating satisfactory flame retardant properties.

Further, test pieces of 3 mm thick flame retardant-containing polycarbonate resin plates whose conversion was about 25%, about 50%, about 75% or about 100% were prepared by the above process wherein the extrusion temperature was adjusted within a range of 220 to 350° C. and the reaction time was adjusted within a range of 1 to 30 minutes. The average molecular weight of each test piece was measured. In addition, the test pieces were subjected to an Izod impact test according to JIS-7110 and a tensile test according to JIS-7113. The results obtained are shown in Table 9 hereinafter given. As previously mentioned, the average molecular weight of a 3 mm thick resin plate comprising the polycarbonate resin alone was 30000.

Comparative Example 6

Comparative test pieces of a 3 mm thick flame retardant-containing polycarbonate resin plate having a conversion of reaction of about 50% were prepared in the same manner as in Example 6, except for using mono-functional diphenyl-2-methacryloyloxyethyl acid phosphate represented by formula (16) shown below as a flame retardant and changing the heating temperature and the reaction time to 275° C. and about 8 minutes.

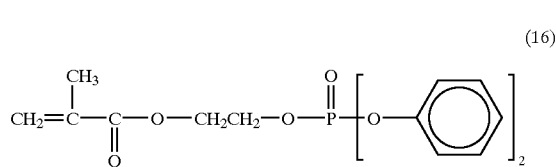

(16)

The average molecular weight of the comparative test piece was 18300, showing a reduction from that of the test piece of Example 6. The oxygen index of the comparative test piece as measured in accordance with JIS-K201 was 21, which was the same as that of the test piece of Example 6, indicating satisfactory flame retardant properties.

Further, comparative test pieces of 3 mm thick flame retardant-containing polycarbonate resin plates whose conversion was about 25%, about 50%, about 75% or about 100% were prepared by adjusting the extrusion temperature within a range of 220 to 350° C. and adjusting the reaction time within a range of 2 to 30 minutes. The average molecular weight of each test piece was measured. In. addition, the test pieces were subjected to an Izod impact test according to JIS-7110 and a tensile test according to JIS-7113. The results obtained are shown in Table 9 below.

TABLE 9

| Conversion of the reaction | Example 6 | | | Comparative Example 6 | | |
|---|---|---|---|---|---|---|
| | Mv | Impact Strength[*1] | Tensile Strength[*2] | Mv | Impact Strength[*1] | Tensile Strength[*2] |
| ca. 25% | 25400 | 83 | 710 | 23200 | 79 | 650 |
| ca. 50% | 21200 | 81 | 680 | 18300 | 75 | 590 |
| ca. 75% | 18900 | 78 | 650 | 16200 | 62 | 550 |
| ca. 100% | 16300 | 75 | 610 | 14300 | — | — |

[*1]: kgf·cm/cm$^2$
[*2]: kgf/cm$^2$

It can be seen from Tables 1, 3, 5, and 7 to 9 that all the test pieces of Examples 1 to 6 in which a bi- or multi-functional additive has been allowed to react with a polyester resin show a smaller molecular weight reduction than the comparative test pieces of Comparative Examples 1 to 6 in which a mono-functional additive has been allowed to react with the polyester resin. As a result, reductions in impact strength and tensile strength of the former are suppressed as compared with the latter.

It is also seen from Tables 2, 4, and 6 that the film test pieces of Examples 1 to 3 in which a bi-functional ultraviolet absorber has been allowed to react with a polyester resin undergo smaller increase in change of yellowness index (ΔYI) and haze (%) in the accelerated exposure test, proving superior in weather resistance, than the comparative film test pieces of Comparative Examples 1 to 3 in which a mono-functional ultraviolet absorber has been allowed to react with the polyester resin. This is because the unreacted ultraviolet absorbers present in the film test pieces of Examples 1 to 3 are dimers which hardly migrate and vaporize.

Industrial Applicability

As is apparent from the foregoing description and test results, since the additive presented in the additive-containing resin molded article according to the present invention in a bound form to the polymer molecules of the polyester resin is bi- or multi-functional, the molecular weight reduction is suppressed as compared with resin molded articles having a mono-functional additive bonded therein. As a result, reductions in mechanical strength and other various physical properties are suppressed. In addition, the additive, being fixed by bonding, is prevented from vaporizing with time, which brings about the remarkable effect that the additive sustains its effect for a prolonged period of time.

Further, the production process of the present invention can be carried out with various conventional general-purpose molding machines simply by adding the step of adding a bi- or multi-functional additive in the stage of molding to allow the additive to react with the polymer molecules of a polyester resin in a heat-melted state. There is no need to install any special molding machine, equipment, etc. Therefore, the process is economical and makes it feasible to produce molded articles on a large-volume scale with good efficiency similarly to the conventional production systems.

What is claimed is:

1. A process for producing an additive-containing resin molded article, which comprises melt-molding a thermoplastic polyester resin, wherein a multi-functional additive having two or more of the same or different functional groups each selected from the group consisting of a hydroxyl group, carboxyl group, amino group, or ester bond is added to said resin and each of the said functional groups of said additive and is allowed to react with polymer molecules of the polyester resin which is in a molten state, wherein said additive is an ultraviolet absorber selected from 2,2'-methylenebis-[4-(hydroxyethyl)-6-(2H-benzotriazol-2-yl)phenol], 2,2'-methylenebis-[3-(carboxyl)-6-(2H-benzotriazol-2-yl)phenol], 2,2'-methylene-[(4-hydroxyethyl-4'-carboxyl)-6,6'-(2H-benzotriazol-2-yl)phenol], and 2,2'-methylenebis-[4-(hydroxyoctyl)-6-(2H-benzotriazol-2-yl)phenol], a flame retardant comprising any one of dibutylbishydroxypropyl pyrophosphate, dibutyltrishydroxypropyl triphosphate, and phenyl-bis(2-methacryloyloxyethyl) phosphate, a stainproofing agent comprising any one of α,ω-diaminopolydimethylsiloxane and fluorinated bisphenol A, an antioxidant comprising bis-(4-hydroxethylphenyl)amine, or an antistatic agent comprising any one of stearoamidopropyldimethyl-β-hydroxyethylammonium dihydrogen phosphate and N,N-bis(2-hydroxyethyl)-N-(3-dodecyloxy-2-hydroxypropyl)methylammonium methosulfate.

2. A process of reducing exudation or vaporization of an additive from a polyester resin molded article, which comprises melt-molding a thermoplastic polyester resin in the presence of a bi- or multi-functional additive having two or more of the same or different functional groups each selected from the group consisting of a hydroxyl group, carboxyl group, amino group, and ester bond is added to said resin and allowed to react with and bond to polymer molecules of the polyester resin which is in a molten state thereby fixing the additive via an ester or amide linkage to polymer molecules of the polyester resin, wherein said additive is an ultraviolet absorber comprising any one of 2,2'-methylenebis-[4-(hydroxyethyl)-6-(2H-benzotriazol-2-yl)phenol], 2,2'-methylenebis-[3-(carboxyl)-6-(2H-benzotriazol-2-yl)phenol], 2,2'-methylene-[(4-hydroxyethyl-4'-carboxyl)-6,6'-(2H-benzotriazol-2-yl)phenol], and 2,2'-methylenebis-[4-(hydroxyoctyl)-6-(2H-benzotriazol-2-yl)phenol], a flame-retardant comprising any one of dibutylbishydroxypropyl pyrophosphate, dibutyltrishydroxypropyl triphosphate, and phenyl-bis(2-methacryloyloxyethyl) phosphate, a stainproofing agent comprising any one of α,ω-diaminopolydimethylsiloxane and fluorinated bisphenol A, an antioxidant comprising bis-(4-hydroxethylphenyl)amine, or an antistatic agent comprising any one of stearoamidopropyldimethyl-β-hydroxyethylammonium dihydrogen phosphate and N,N-bis(2-hydroxyethyl)-N-(3-dodecyloxy-2-hydroxypropyl)methylammonium methosulfate.

3. The process according to claim 1 or 2, wherein the additive exists among the polymer molecules of the polyester resin.

4. The process according to claim 1 or 2, wherein the additive-containing layer is integrally superposed on one or both sides of the thermoplastic resin layer which does not contain said additive.

5. The process according to claim 1 or 2, wherein said polyester resin comprises at least one of polycarbonate, polyarylate, polycaprolactone, polyethylene terephthalate, polybutylene terephthalate, polydimethylcyclohexane terephthalate, and a copolymer or a polymer blend comprising two or more of these polymers.

6. An additive-containing resin molded article comprising a thermoplastic polyester resin and a bi- or multi-functional additive having two or more of the same or different functional groups each selected from the group consisting of a hydroxyl group, carboxyl group, amino group, or ester bond therein, wherein each of said functional groups of said additive is bonded to the polymer molecules of the thermoplastic polyester resin, wherein said additive is an ultraviolet absorber comprising any one of 2,2'-methylenebis-[4-(hydroxyethyl)-6-(2H-benzotriazol-2-yl)phenol], 2,2'-methylenebis-[3-(carboxyl)-6-(2H-benzotriazol-2-yl)phenol], 2,2'-methylene-[(4-hydroxyethyl-4'-carboxyl)-6,6'-(2H-benzotriazol-2-yl)phenol], and 2,2'-methylenebis-[4-(hydroxyoctyl)-6-(2H-benzotriazol-2-yl)phenol], a flame retardant comprising any one of dibutylbishydroxypropyl pyrophosphate, dibutyltrishydroxypropyl triphosphate, and phenyl-bis(2-methacryloyloxyethyl) phosphate, a stainproofing agent comprising any one of α,ω-diaminopolydimethylsiloxane and fluorinated bisphenol A, an antioxidant comprising bis-(4-hydroxethylphenyl)amine, or an antistatic agent comprising any one of stearoamidopropyldimethyl-β-hydroxyethylammonium dihydrogen phosphate and N,N-bis(2-hydroxyethyl)-N-(3-dodecyloxy-2-hydroxypropyl)methylammonium methosulfate.

7. An additive-containing resin molded article comprising an integral laminate of (1) an additive-containing layer comprising a thermoplastic polyester resin and a bi- or multi-functional additive having two or more of the same or different functional groups each selected from the group consisting of a hydroxyl group, carboxyl group, amino group, or ester bond, wherein each of said functional groups of said additive is bonded to the polymer molecules of the thermoplastic polyester resin, and (2) a thermoplastic resin layer which does not contain said additive, wherein said additive is an ultraviolet absorber comprising any one of 2,2'-methylenebis-[4-(hydroxyethyl)-6-(2H-benzotriazol-2-yl)phenol], 2,2'-methylenebis-[3-(carboxyl)-6-(2H-benzotriazol-2-yl)phenol], 2,2'-methylene-[(4-hydroxyethyl-4'-carboxyl)-6,6'-(2H-benzotriazol-2-yl)phenol], and 2,2'-methylenebis-[4-(hydroxyoctyl)-6-(2H-benzotriazol-2-yl)phenol], a flame retardant comprising any one of dibutylbishydroxypropyl pyrophosphate, dibutyltrishydroxypropyl triphosphate, and phenyl-bis(2-methacryloyloxyethyl) phosphate, a stainproofing agent comprising any one of α,ω-diaminopolydimethylsiloxane and fluorinated bisphenol A, an antioxidant comprising bis-(4-hydroxethylphenyl)amine, or an antistatic agent comprising any one of stearoamidopropyldimethyl-β-hydroxyethylammonium dihydrogen phosphate and N,N-bis(2-hydroxyethyl)-N-(3-dodecyloxy-2-hydroxypropyl) methylammonium methosulfate.

8. The additive-containing resin molded article according to claim 6 or 7 wherein the additive exists among the polymer molecules of the polyester resin.

9. The additive-containing resin molded article according to claim 6 or 7 wherein the additive-containing layer is integrally superposed on one or both sides of the thermoplastic resin layer which does not contain said additive.

10. The additive-containing resin molded article according to claim 6 or 7, wherein said polyester resin comprises at least one of polycarbonate, polyarylate, polycaprolactone, polyethylene terephthalate, polybutylene terephthalate, polydimethylcyclohexane terephthalate, and a copolymer or a polymer blend comprising two or more of these polymers.

* * * * *